US011924350B2

(12) United States Patent
Bernauer et al.

(10) Patent No.: US 11,924,350 B2
(45) Date of Patent: Mar. 5, 2024

(54) CRYPTOGRAPHICALLY ENFORCED PARTIAL BLINDING FOR DISTRIBUTED SYSTEM

(71) Applicant: Digital Asset (Switzerland) GmbH, Zurich (CH)

(72) Inventors: Alexander Bernauer, Zurich (CH); Tamas Blummer, New York, NY (US); Shaul Kfir, New York, NY (US); James Benton Litsios, New York, NY (US); Simon Meier, Zurich (CH)

(73) Assignee: Digital Asset (Switzerland) GmbH (CH)

( * ) Notice: Subject to any disclaimer, the term of this patent is extended or adjusted under 35 U.S.C. 154(b) by 286 days.

(21) Appl. No.: 17/388,656

(22) Filed: Jul. 29, 2021

(65) Prior Publication Data

US 2023/0031532 A1 Feb. 2, 2023

(51) Int. Cl.

| | |
|---|---|
| ***H04L 9/00*** | (2022.01) |
| ***H04L 9/32*** | (2006.01) |
| *G06Q 20/38* | (2012.01) |

(52) U.S. Cl.

CPC ......... *H04L 9/3236* (2013.01); *G06Q 20/389* (2013.01); *G06Q 2220/00* (2013.01); (Continued)

(58) Field of Classification Search

CPC ....... H04L 9/3236; H04L 9/3239; H04L 9/50; H04L 2209/56; G06Q 20/389; G06Q 2220/00

See application file for complete search history.

(56) References Cited

U.S. PATENT DOCUMENTS

| | | |
|---|---|---|
| 5,966,706 A | 10/1999 | Biliris et al. |
| 8,655,782 B2 | 2/2014 | Poon et al. |

(Continued)

FOREIGN PATENT DOCUMENTS

| | | |
|---|---|---|
| CN | 102057617 A | 5/2011 |
| CN | 104915249 A | 9/2015 |

(Continued)

OTHER PUBLICATIONS

A. Kosba, A. Miller, E. Shi, Z. Wen and C. Papamanthou, "Hawk: The Blockchain Model of Cryptography and Privacy-Preserving Smart Contracts," 2016 IEEE Symposium on Security and Privacy (SP), San Jose, CA, USA, 2016, pp. 839-858 (Year: 2016).*

(Continued)

*Primary Examiner* — Farid Homayounmehr
*Assistant Examiner* — Zhimei Zhu
(74) *Attorney, Agent, or Firm* — Lerner David LLP

(57) ABSTRACT

A system and method for selectively transmitting cryptographically signed information to a limited number of parties of an agreement using one or more processors. For each party affected by a decision of a first party, the processors generate a token according to a function of both (i) a cryptographic key of the given party and (ii) a cryptographic key of a second party, and transmit to respective private data stores of each party (a) the first party's decision, (b) the generated token, and (c) an identity of the second party. The decision of the first party and the generated tokens are transmitted to the private data stores of only the parties that are affected by the decision of the first party.

8 Claims, 6 Drawing Sheets

(52) U.S. Cl.
CPC .............. *H04L 9/3239* (2013.01); *H04L 9/50* (2022.05); *H04L 2209/56* (2013.01)

(56) References Cited

U.S. PATENT DOCUMENTS

| | | | |
|---|---|---|---|
| 11,514,448 B1* | 11/2022 | Liberman .......... G06Q 20/3829 | |
| 2003/0061537 A1 | 3/2003 | Cha et al. | |
| 2003/0196099 A1 | 10/2003 | Lampson et al. | |
| 2006/0009999 A1 | 1/2006 | Gee et al. | |
| 2007/0067349 A1 | 3/2007 | Jhaveri et al. | |
| 2009/0122812 A1 | 5/2009 | Steiner et al. | |
| 2010/0106974 A1 | 4/2010 | Aguilera et al. | |
| 2010/0110935 A1 | 5/2010 | Tamassia et al. | |
| 2010/0162249 A1 | 6/2010 | Shpeisman et al. | |
| 2011/0091036 A1 | 4/2011 | Norrman et al. | |
| 2013/0166455 A1 | 6/2013 | Feigelson | |
| 2013/0317984 A1 | 11/2013 | O'Leary et al. | |
| 2014/0089606 A1 | 3/2014 | McKenney | |
| 2014/0201524 A1* | 7/2014 | Dittrich .................. G06F 21/45 | 713/165 |
| 2014/0229739 A1 | 8/2014 | Roth et al. | |
| 2014/0230007 A1 | 8/2014 | Roth et al. | |
| 2014/0279540 A1 | 9/2014 | Jackson | |
| 2014/0279557 A1 | 9/2014 | Abou-Nasr et al. | |
| 2014/0298042 A1 | 10/2014 | Ogura et al. | |
| 2014/0380402 A1 | 12/2014 | Roth | |
| 2015/0120569 A1 | 4/2015 | Belshe et al. | |
| 2015/0161414 A1 | 6/2015 | Pandian et al. | |
| 2015/0209678 A1 | 7/2015 | Edwards et al. | |
| 2015/0235011 A1 | 8/2015 | Swaminathan et al. | |
| 2015/0254640 A1 | 9/2015 | Cassano et al. | |
| 2015/0262173 A1 | 9/2015 | Durbin et al. | |
| 2015/0262176 A1 | 9/2015 | Langschaedel et al. | |
| 2015/0287014 A1 | 10/2015 | Granbery | |
| 2015/0294308 A1 | 10/2015 | Pauker et al. | |
| 2015/0324789 A1 | 11/2015 | Dvorak et al. | |
| 2015/0332256 A1 | 11/2015 | Minor | |
| 2015/0341176 A1 | 11/2015 | Staykov et al. | |
| 2015/0363769 A1 | 12/2015 | Ronca et al. | |
| 2015/0363770 A1 | 12/2015 | Ronca et al. | |
| 2015/0363772 A1 | 12/2015 | Ronca et al. | |
| 2015/0363773 A1 | 12/2015 | Ronca et al. | |
| 2015/0363777 A1 | 12/2015 | Ronca et al. | |
| 2015/0363778 A1 | 12/2015 | Ronca et al. | |
| 2015/0363782 A1 | 12/2015 | Ronca et al. | |
| 2015/0363783 A1 | 12/2015 | Ronca et al. | |
| 2015/0363876 A1 | 12/2015 | Ronca et al. | |
| 2015/0365283 A1 | 12/2015 | Ronca et al. | |
| 2015/0379510 A1* | 12/2015 | Smith ................ G06Q 20/3829 | 705/71 |
| 2016/0188297 A1 | 6/2016 | Kuroiwa | |
| 2017/0017646 A1 | 1/2017 | Kumar et al. | |
| 2017/0346641 A1* | 11/2017 | Medvinsky ......... H04L 63/0435 | |

FOREIGN PATENT DOCUMENTS

| | | |
|---|---|---|
| CN | 105488665 A | 4/2016 |
| KR | 20150129223 A | 11/2015 |
| WO | 2012079170 A1 | 6/2012 |
| WO | 2016164310 A1 | 10/2016 |

OTHER PUBLICATIONS

"A Simple Model for Smart Contracts", Richard Gendal Brown, Feb. 10, 2015, <https://gendal.me/2015/02/10/a-simple-model-for-smart-contracts >, retreived from the internet on Jan. 10, 2017.

Australian Examination Report for Application No. 2018202830 dated Jun. 28, 2019, 3 pages.

Examination Report cited in corresponding Australian Application No. 2016266094 dated Jan. 11, 2017, 5 pages.

Examination Report in Australian Application No. 2016266094, dated Nov. 20, 2017, 5 pages.

Extended European Search Report for Application No. 17828538.3 dated Mar. 23, 2020, 10 pages.

Extended European Search Report dated Dec. 10, 2019, in corresponding EP Application No. 16909020.6; 6 pages.

International Preliminary Report on Patentability dated Aug. 10, 2018 in International Application No. PCT/US2017/042155; 29 pages.

International Search Report and Written Opinion cited in corresponding International Application No. PCT/US2016/042322 dated Sep. 30, 2016, 8 pages.

International Search Report for Application No. PCT/US2017/042155 dated Nov. 17, 2017, 6 pages.

Notice of Grant in Australian Application No. 2016266094, dated May 10, 2018, 1 page.

Swanson, T. (Apr. 2015), "Consensus-as-a-service: a brief report on the emergence of permissioned, distributed ledger systems," (66 pages).

White; How computers work; 7th Edition, (Year—2004), 44 pages.

Written Opinion dated Nov. 17, 2017 in International Application No. PCT/US2017/042155; 8 pages.

* cited by examiner

CRYPTOGRAPHICALLY ENFORCED PARTIAL BLINDING FOR DISTRIBUTED SYSTEM

CROSS-REFERENCE TO RELATED APPLICATION

The present application is a continuation of U.S. patent application Ser. No. 15/210,668, filed on Jul. 14, 2016, the disclosure of which is incorporated herein by reference.

TECHNICAL FIELD

The present disclosure relates to a platform supporting a distributed system for executing transactional workflows among a plurality of participants.

RELATED ART

Existing closed, centrally administered ledgers utilized for settling assets, obligations, and transactions are considered opaque and error-prone. This makes oversight cumbersome, requires many duplicative processes and ledgers, and allows the potential for fraud. The first and currently largest alternative to the existing ledger architectures is represented by a distributed digital ledger called Bitcoin, which uses a blockchain data structure. A fundamental principle of Bitcoin's operation is that the system is set up as a peer-to-peer transaction mechanism that utilizes public-private key cryptography, has no central intermediary or central repository, and allows all participants in the network to hold and validate the integrity of a full copy of the ledger in real time. The Bitcoin blockchain was designed in order to create a trustless native asset, bitcoin, which could be exchanged with pseudonymous parties across the globe.

Current platforms built to support digital assets on top of Bitcoin-like or blockchain-like systems are not generally structured to provide comprehensive protection to financial institutions as may be required by law for many of their existing transaction businesses. These platforms may not have contemplated the regulatory regime for financial institutions and financial transactions in general. As a result, institutional investors have hesitated to enter the digital assets market and have avoided the use of distributed ledgers for their existing businesses.

SUMMARY

The exemplary embodiments disclosed herein provide a distributed system for executing transactional workflows among a plurality of participants. An exemplary embodiment method of manipulating data structures for distributed multilateral bookkeeping includes receiving previously agreed and formalized rules; receiving an authorized decision; evolving an agreement based on the authorized decision and the rules; notifying participants in the agreement of the evolved agreement; and storing the evolved agreement with evidence of notification in a shared append-only ledger.

The method may include detecting contradicting agreements; and excluding a contradicting agreement based on evidence from the shared append-only ledger. The method may include providing participants partial insight to agreements through a partial agreement store sufficient for their own authorization and records, wherein the partial agreement store of the participants remains without contradiction to other participant's records and is validatable within the bounds of their visibility.

The method may include automatically auditing authorization and evolution of the agreement. The method may be employed where the append-only ledger comprises a blockchain.

The method may include executing transactional workflows between a plurality of participants including: interacting with the append-only ledger using a Command Query Responsibility Segregation (CQRS) pattern having a plurality of modules, wherein the modules include: a ledger writer configured to record evidence indicative of a transaction dataset through a first write module of the CQRS to the ledger; and a ledger reader configured to detect evidence on the ledger having a matching notification token, and read such matching evidence through a first read module of the CQRS.

The method may be employed where the evidence indicative of an agreement comprises a timestamp indicative of recordation time on the ledger. The method may be employed where the evidence indicative of an agreement comprises a Merkle hash of the transaction dataset. The method may further be employed where the hashed transaction dataset comprises proof of a corresponding multilaterally authorized business intent message and proof of a current agreement used to translate the business intent message into the transaction dataset.

The method may be employed where each of a plurality of distributed nodes comprise different modules of the CQRS. The method may further be employed where a reduced subset of the nodes comprises the first write module of the CQRS.

The method may be employed where the matching notification token is detected through a second read module of the CQRS. The method may include issuing an announcement of identities on the ledger. The method may further include computing a unique shared secret for each participant and log-writer pair. The method may be employed where the matching notification token is recognizable by involved parties but remains secret to others.

The method may be employed where the transaction dataset stores the current agreement as an abstract syntax tree (AST). The method may further be employed where the transaction dataset is updated with Merkle hashes to form a Merklized abstract syntax tree (MAST).

The method may include further auditing to prove that an evolution of an agreement from a first transaction dataset to a second transaction dataset was properly authorized and properly executed, and that all participants were notified of the changes pertinent to them. The method may further be employed where auditing further proves that participants were not notified of changes not pertinent to them.

An exemplary embodiment system for distributed multilateral bookkeeping includes a business intent unit configured to receive previously agreed and formalized rules; a choice unit configured to receive an authorized decision from the business intent unit; a processing unit configured to evolve an agreement based on the authorized decision and the rules; a notification unit configured to notify participants in the agreement of the evolved agreement; and an append-only ledger configured to store the evolved agreement with evidence of notifications.

The system may include an audit unit configured to detect contradicting agreements. The system may further be employed where a detected contradicting agreement is excluded based on evidence from the shared append-only ledger. The system may further be employed where the audit unit supports automatically auditing authorization and evolution of the agreement.

The system may be employed where the append-only ledger supports: providing participants partial insight to agreements through a partial agreement store sufficient for their own authorization and records, wherein the partial agreement store of participants remains without contradiction to other participant's records and is validatable within the bounds of their visibility.

The system may include a Command Query Responsibility Segregation (CQRS) pattern having a plurality of modules supporting interaction with the append-only ledger; a ledger writer configured to record evidence indicative of a transaction dataset through a first write module of the CQRS to the ledger; and a ledger reader configured to detect evidence on the ledger having a matching notification token, and read such matching evidence through a first read module of the CQRS.

The system may be employed where the append-only ledger comprises a blockchain. The system may be employed where the evidence indicative of an agreement comprises a timestamp indicative of recordation time on the ledger.

The system may be employed where the evidence indicative of an agreement comprises a Merkle hash of the transaction dataset. The system may further be employed where the hashed transaction dataset comprises proof of a corresponding multilaterally authorized business intent message and proof of a current agreement used to translate the business intent message into the transaction dataset.

The system may be employed where each of a plurality of distributed nodes comprise different modules of the CQRS. The system may further be employed where a reduced subset of the nodes comprises the first write module of the CQRS.

The system may be employed where each node is configured to maintain a received announcement of identities on the ledger. The system may be employed where each node is configured to compute a unique shared secret corresponding to its participant and any log-writer. The system may be employed where the matching notification token is recognizable by involved parties but secret to others. The system may be employed where the matching notification token is detected through a second read module of the CQRS.

The system may be employed where the transaction dataset stores the current agreement as an abstract syntax tree (AST). The system may further be employed where the transaction dataset is updated with Merkle hashes to form a Merklized abstract syntax tree (MAST).

The system may include an auditor configured for proving that an evolution of an agreement from a first transaction dataset to a second transaction dataset was properly authorized and properly executed, and that all participants were notified of the changes pertinent to them. The system may be employed where the auditor further proves that participants were not notified of changes not pertinent to them.

An exemplary embodiment program storage device tangibly embodying program steps executable by a computer for manipulating data structures in distributed multilateral bookkeeping includes program steps for receiving previously agreed and formalized rules; receiving an authorized decision; evolving an agreement based on the authorized decision and the rules; notifying participants in the agreement of the evolved agreement; and storing the evolved agreement with evidence of notification in a shared append-only ledger.

The device may include steps for: detecting contradicting agreements; and excluding a contradicting agreement based on evidence from the shared append-only ledger. The device may include steps for: providing participants partial insight to agreements through a partial agreement store sufficient for their own authorization and records, wherein the partial agreement store of the participants remains without contradiction to other participant's records and is validatable within the bounds of their visibility.

The device may include steps for automatically auditing authorization and evolution of the agreement. The device may be employed where the append-only ledger comprises a blockchain.

The device may include steps for executing transactional workflows between a plurality of participants including: interacting with the append-only ledger using a Command Query Responsibility Segregation (CQRS) pattern having a plurality of modules, wherein the modules include: a ledger writer configured to record evidence indicative of a transaction dataset through a first write module of the CQRS to the ledger; and a ledger reader configured to detect evidence on the ledger having a matching notification token, and read such matching evidence through a first read module of the CQRS.

The device may be employed where the evidence indicative of an agreement a timestamp indicative of recordation time on the ledger. The device may be employed where the evidence indicative of an agreement comprises a Merkle hash of the transaction dataset. The device may further be employed where the hashed transaction dataset comprises proof of a corresponding multilaterally authorized business intent message and proof of a current agreement used to translate the business intent message into the transaction dataset.

The device may be employed where each of a plurality of distributed nodes comprise different modules of the CQRS. The device may further be employed where a reduced subset of the nodes comprises the first write module of the CQRS.

The device may be employed where the matching notification token is detected through a second read module of the CQRS. The device may include steps for issuing an announcement of identities on the ledger. The device may include steps for computing a unique shared secret for each participant and log-writer pair. The device may be employed where the matching notification token is recognizable by involved parties but remains secret to others.

The device may be employed where the transaction dataset stores the current agreement as an abstract syntax tree (AST). The device may further be employed where the transaction dataset is updated with Merkle hashes to form a Merklized abstract syntax tree (MAST).

The device may include steps for auditing to prove that an evolution of an agreement from a first transaction dataset to a second transaction dataset was properly authorized and properly executed, and that all participants were notified of the changes pertinent to them. The device may further be employed where auditing further proves that participants were not notified of changes not pertinent to them.

BRIEF DESCRIPTION OF THE DRAWINGS

Illustrative, non-limiting exemplary embodiments may be more clearly understood from the following detailed description, particularly when taken in conjunction with the accompanying drawings, in which.

DETAILED DESCRIPTION

Figure 1:
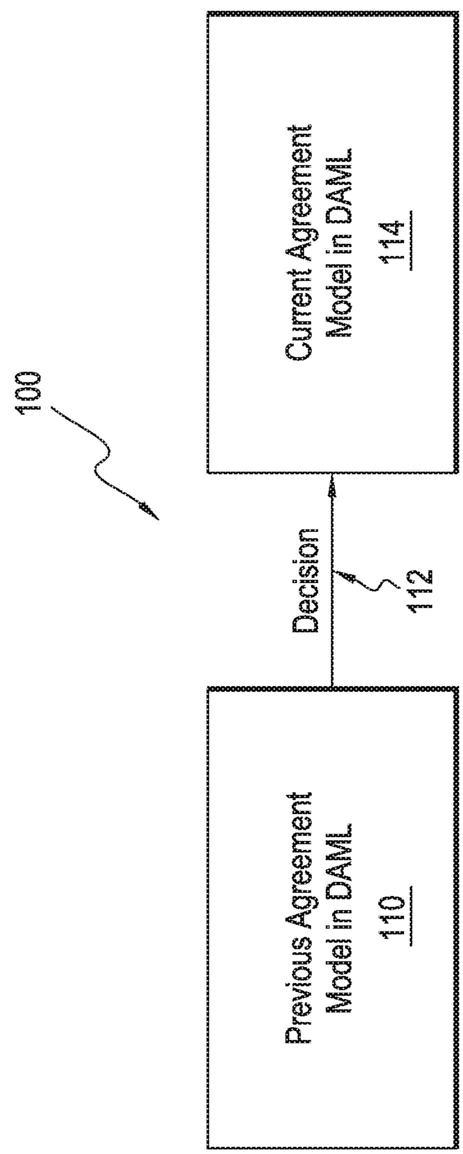
FIG. 1 is a schematic block diagram showing evolution of a Digital Asset Modeling Language (DAML™) agreement through a decision in accordance with an exemplary embodiment of the present disclosure.

The present inventive concept will be described more fully with reference to the accompanying drawings, in which exemplary embodiments are shown. The present inventive concept may, however, be embodied in many different forms and should not be construed as being limited to the embodiments set forth herein. Like reference numerals may refer to like elements throughout this description. As used herein, the word "model" is defined as at least one bundle of agreement(s) or potential transaction(s), which, under certain governing rules such as may be provided by a Master Contract, for example, might or might not have the potential to represent a digitally-represented agreement or a legally binding contract.

An exemplary embodiment system performs multilateral bookkeeping where agreements evolve in consequence of authorized decisions and along previously agreed and formalized rules, participants are guaranteed to learn of agreements that they are involved in, contradicting agreements can be excluded through a shared append-only log of agreement transitions, participants may have only partial insight to agreements that is sufficient for their own authorization and records, the partial agreement store of participants remains without contradiction to other participant's records and is validatable within the bounds of their visibility, and an audit of agreement authorization and evolution can be automated.

As shown in FIG. 1, a Digital Asset Modeling Language (DAML™) agreement evolution is indicated generally by the reference numeral 100. A DAML™ previous agreement 110 is affected by a decision 112 to yield a DAML™ current agreement 114.

Figure 2:
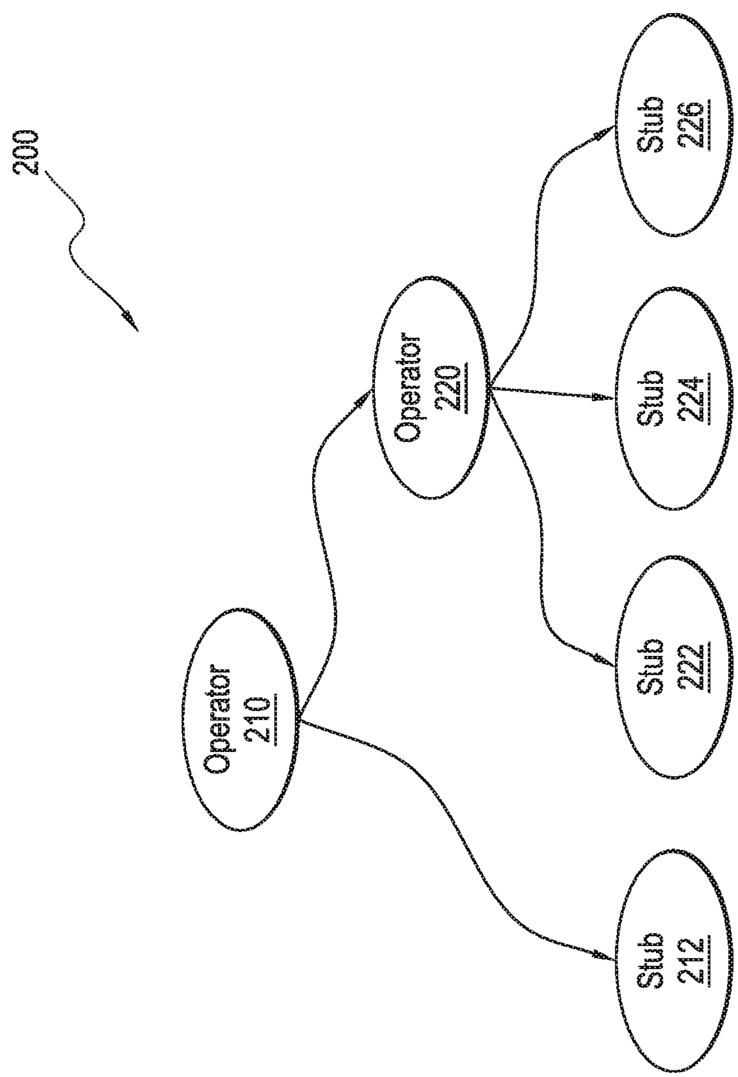
FIG. 2 is a schematic Abstract Syntax Tree (AST) parsing diagram in accordance with an exemplary embodiment of the present disclosure.

Turning to FIG. 2, an exemplary DAML™ Abstract Syntax Tree (AST) parsing diagram is indicated generally by the reference numeral 200. Here, an operator 210 references a stub 212 and another operator 220. The other operator 220 references a first stub 222, a second stub 224, and a third stub 226. Although the exemplary AST is based on DAML™, alternate embodiment ASTs may be based on alternate contract specification languages (CSL).

Figure 3:
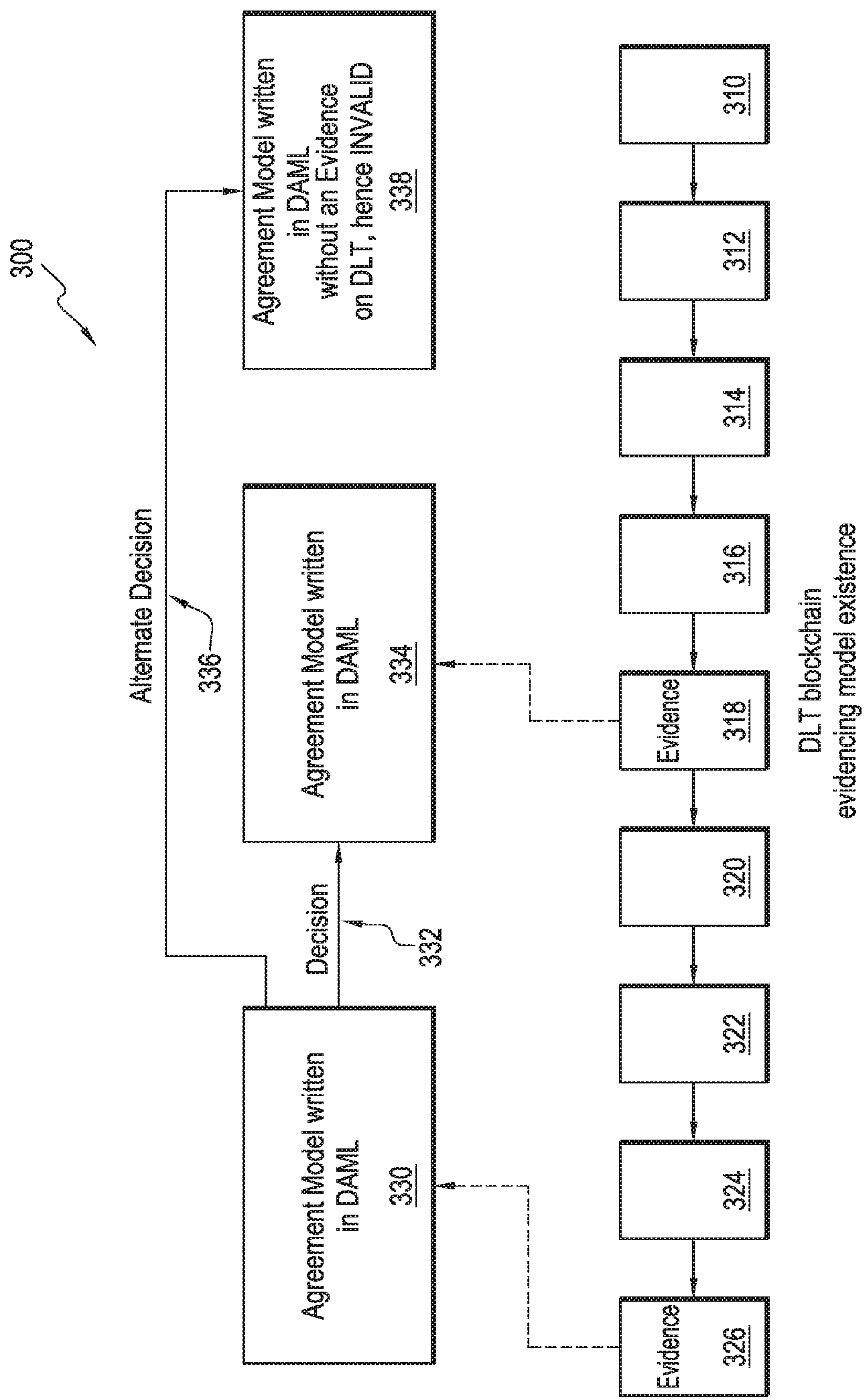
FIG. 3 is a schematic block diagram showing evolution of a DAML™ agreement through a decision validated with Distributed Ledger Technology (DLT) Log evidence in accordance with an exemplary embodiment of the present disclosure.

Turning now to FIG. 3, a DAML™ agreement evolution validated with Distributed Ledger Technology (DLT) Log evidence is indicated generally by the reference numeral 300. Here, a DLT blockchain Global Synchronization Log includes blocks 310, 312, 314, 316, 318, 320, 322, 324, and 326. A DAML™ previous agreement 330 is affected by a decision 332 to yield a DAML™ agreement 334. The DAML™ previous agreement 330 is affected by an alternate decision 336 to yield a DAML™ alternate agreement 338. Evidence from block 326 is employed to verify the previous agreement 330, and evidence from block 318 is employed to verify the agreement 334. However, since there is no evidence on the DLT blockchain Log to verify the alternate agreement 338, the alternate agreement 338 is invalid.

Figure 4:
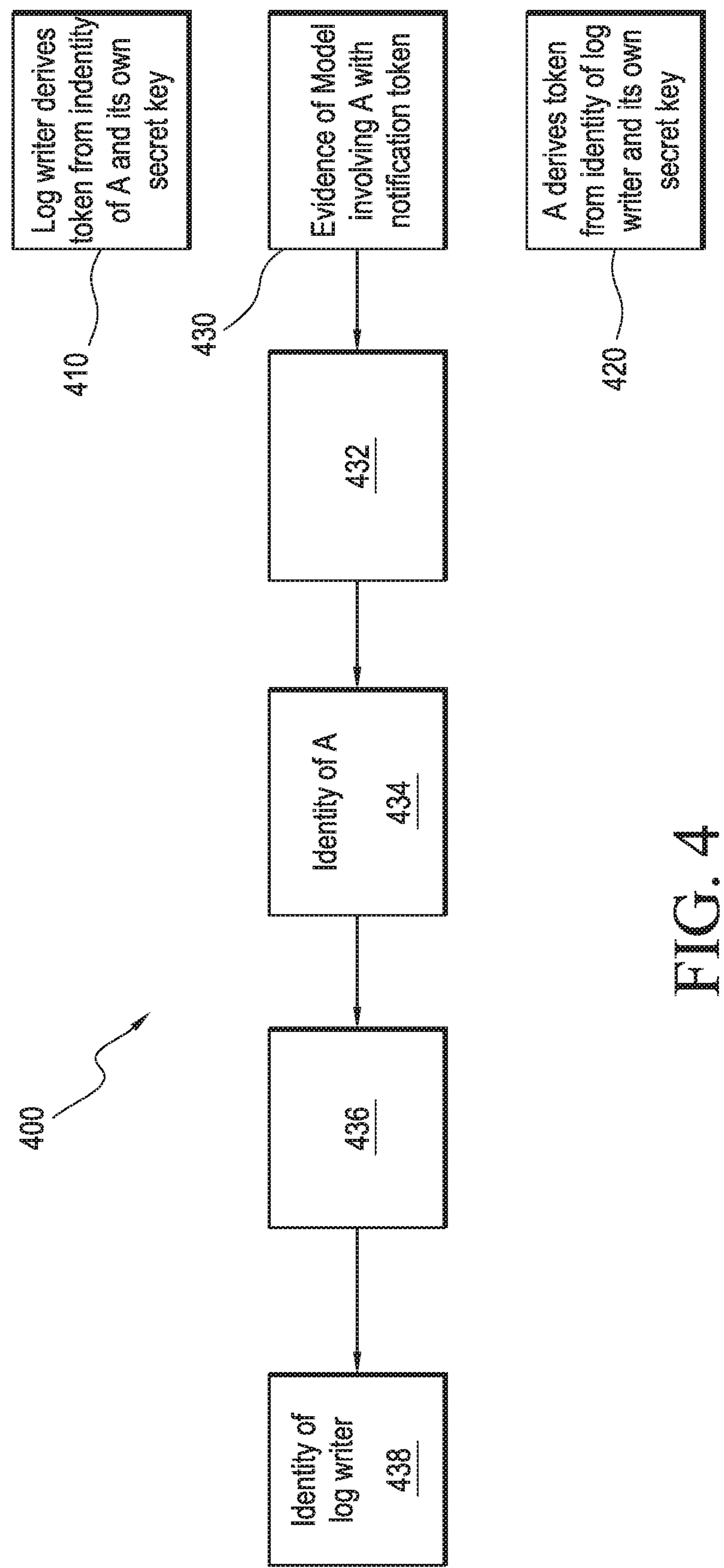
FIG. 4 is a schematic block diagram showing party identification in accordance with an exemplary embodiment of the present disclosure.

As shown in FIG. 4, a party identification workflow is indicated generally by the reference numeral 400. Here, in function block 410, a log writer derives a token from the identity of Party A and the log writer's secret key. In function block 420, a Party A derives a token from the identity of the log writer and Party A's secret key. In input block 430, evidence of an agreement involving Party A is received with a notification token. The function block 432 may perform optional processing and refer to a function block 434. The function block 434 determines the identity of Party A, and refers to block 436. The function block 436 may perform optional processing and refer to a function block 438. The function block 438, in turn, determines the identity of the log writer.

Figure 5:
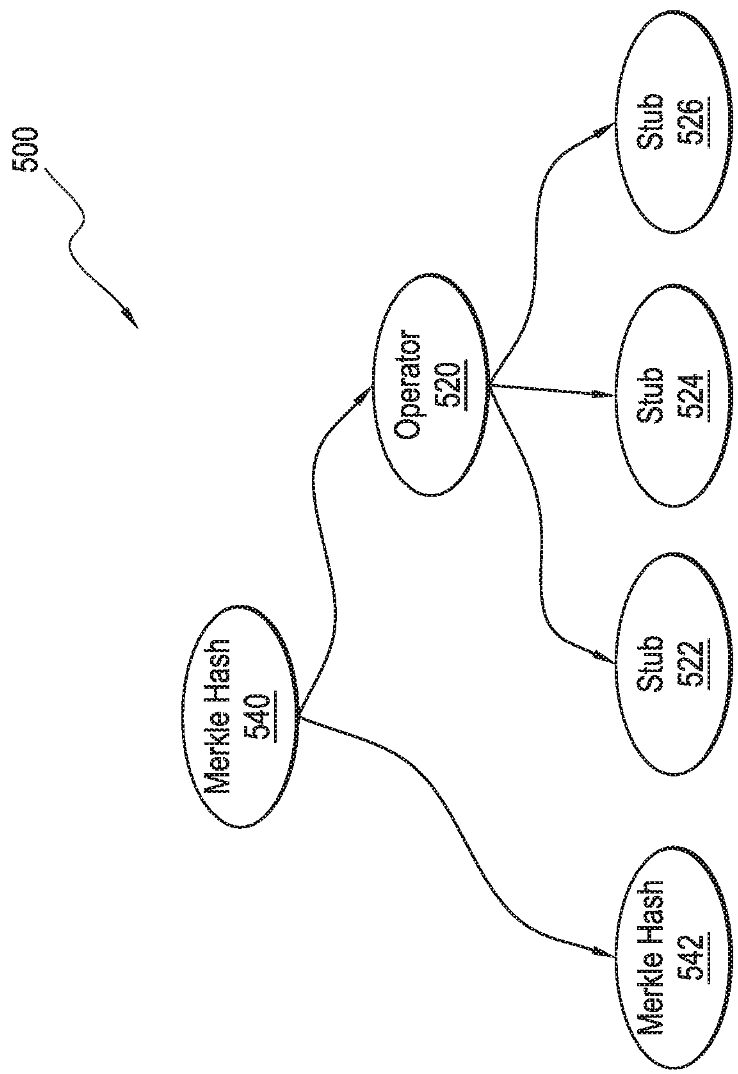
FIG. 5 is a schematic Merklized Abstract Syntax Tree (MAST) parsing diagram in accordance with an exemplary embodiment of the present disclosure.

Turning to FIG. 5, a Merklized Abstract Syntax Tree (MAST) DAML™ parsing diagram is indicated generally by the reference numeral 500. Here, a Merkle hash 540 references another Merkle hash 542 and an operator 520. The operator 520 references a first stub 522, a second stub 524, and a third stub 526.

Figure 6:
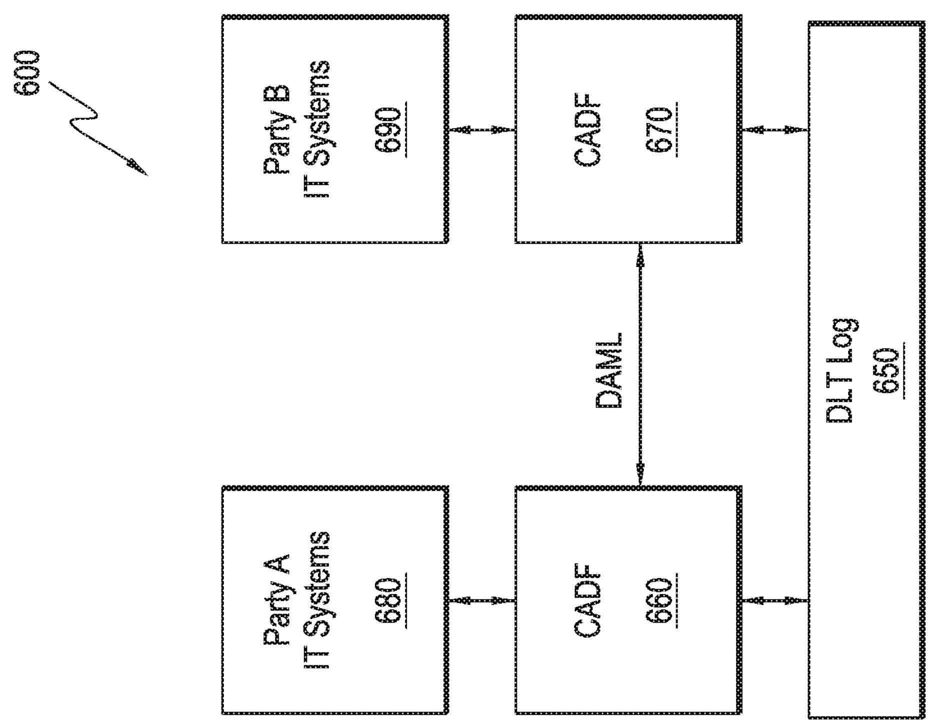
FIG. 6 is a schematic system diagram showing a Contract Authorization and Distribution Framework (CADF) in accordance with an exemplary embodiment of the present disclosure.

Turning now to FIG. 6, a Contract Authorization and Distribution Framework (CADF) interconnected system is indicated generally by the reference numeral 600. Here, a Global Synchronization Log 650, based on an exemplary Digital Ledger Technology (DLT) blockchain, is connected to each of a first CADF unit 660 and a second CADF unit 670. The first and second CADF units communicate using agreements written in DAML™ that may be translated to AST or MAST. The CADF system may authorize, store and request agreements from another CADF system acting in behalf of another party. The first CADF 660, in turn, is connected to the information technology (IT) systems 680 of Party A, while the second CADF 670, in turn, is connected to the IT systems 690 of Party B.

The Digital Asset Modeling Language (DAML™) is an expressive language enabling financial institutions to model and execute agreements with certainty and finality. The Global Synchronization Log based on Distributed Ledger Technology (DLT) is a shared, replicated ledger, such as but not limited to a blockchain, with a synchronizing mechanism known as a "consensus algorithm". A Contract Authorization and Distribution Framework (CADF) supports or includes a service to selectively disclose contracts to parties involved and collect their authorizations for decisions.

The presently disclosed Digital Asset Platform supports roles with different abilities to enter into and/or review agreements, or technically support the security of the platform. Unique design decisions while configuring DAML™, DLT Log, and/or CADF provide powerful tools to streamline and execute contractual workflows between and within financial institutions.

DAML™ code models an agreement between parties as a model typically eventually referencing further DAML™ models, which each evolve through a decision by a party into a new model. The new model might involve other parties to or into the contract, might offer new decision choices, or might even be the same as the previous model. Unique properties of the DAML™ language particularly suited for such purposes include: 1) A DAML model enumerates all possible current choices of the parties and their respective consequences. 2) A decision evolves a DAML model into a new DAML model in finite steps after which the new DAML model awaits new decisions to evolve further. 3) A DAML model can be analyzed, to deduce: a) Current parties and their available choices; and b) The set of parties who would become involved in the new contract if a current party would decide for any of its respective current choices. 4) DAML allows for extracting fractions of the model such that those fractions are also valid DAML models on their own, but potentially with a lesser number of involved parties.

While DAML is human readable and editable, it can be converted into and from a well-defined and unique technical representation called an Abstract Syntax Tree (AST), as shown in FIG. 2. DAML allows for Operators that might combine Stubs or further Operators. An Operator might represent a decision option and its sub-tree might define the effect of the decision. A Stub might be replaced with a model, again represented as an AST, in consequence of a decision.

A reliable bookkeeping of current agreements is used to avoid contradicting agreements being considered simultaneously valid by any party. Distributed Ledger Technology (DLT) presents an alternative to third-party and bilateral bookkeeping. Its primary advantages lie in scalability if compared with bilateral bookkeeping, and lie in attack resilience if compared to third-party bookkeeping. Distributed Ledger Technology introduces multilateral bookkeeping whereby members of the network cooperate to create a reliable shared infrastructure that decides on the order of agreements. Once the order of agreements is definite, contradicting agreements may be resolved by considering only the earlier agreement valid. The DLT Global Synchronization Log is an append-only log of evidence for agreement evolutions. The DLT Log data structure features sophisticated integrity proofs based on digital signatures and cryptographic hashes. Members of the DLT Log network can prove to themselves through execution of a consensus algorithm that their copy of the log matches those of the majority of network participants. A benefit of DLT for contractual parties is that if the parties decide that the DLT Log shall include all contracts, it can identify the complete set of current contracts while automatically excluding alternatives.

When representing the complete set of current contracts, the DLT Log also acts as a publication channel to announce new contracts to the parties involved. Notification of involved parties is required for the validity of an agreement. The presently disclosed Digital Asset Platform stores notification tokens into the evidence of the new model. Involved parties may monitor for their tokens. To protect privacy of involved parties, the notification token is calculated such that it is known to be linked to the party only by the writer of the log and the involved party.

The notification token is a function of a shared secret between the log writer and the notified party. Derivation of shared secrets is made possible by prior announcement of the identities of the log writer and the involved parties on the log. Identities are tied to public keys for which the private key is kept secret by the actor behind the announced identity. The log supports announcement and revocation of identities for regular key rolling or emergency withdrawal after a security breach affecting the party.

A Contract Authorization and Distribution Framework (CADF) are used for decisions that require proper authorization by the party who makes a choice. The platform collects digital signatures on business intent formalized using DAML derived ASTs into evidence authorization. Since the DAML might not be authored by the authorizer, it needs to be delivered on demand by the author's network node. Delivery of the AST for signature might be denied if the requestor is not entitled to see the contract, or replied with a partially blinded AST, just sufficient to support the decision process of the authorizer.

The platform uses a Merklized Abstract Syntax Tree (MAST) for partial blinding of an AST. Parts of an AST are substituted with the Merkle Hash of their respective sub-tree to create a MAST. Merkle Hashes do not reveal anything about the information blinded. Merkle Hashes are computed such that the digital signature on the complete AST or on any of its derived MAST is verifiable with knowledge of the AST or any of its derived MAST. As a result, parties will hold incomplete sets of copies of models just as they are entitled to see or are required to authorize. Their model storage resembles multilateral bookkeeping, but formalized and properly authorized.

Once sufficient authorization is collected, the new agreement will be evidenced on the DLT Log. The evidence does not disclose anything about the model's content, but is a fingerprint compiled such that all involved parties are able to prove that the evidence is for a particular agreement. The multilateral model store filtered by evidence on the DLT Log completely and reliably defines the current set of agreements for all parties involved.

The various network nodes connected to the shared infrastructure may have different roles. A node may fulfill several roles.

One role is that of a "ledger writer". A network node that records evidence into the append-only log is a ledger writer. Although technically not necessary, it will most likely also guarantee the contradiction-less recording of evidence and, as a consequence, have full visibility into agreements it records, for which it will have full records in its CADF. The role of the ledger writer might be shared by several nodes, such that a ledger write requires joint authorization by them in desired scenarios.

Another role is that of a "ledger reader". This is a network node that acts in behalf of parties that might be involved in some agreements or for supervising authorities. The ledger reader will watch out for notifications for its served parties on the DLT Log, and aggregate a partial database of agreements through its CADF.

Yet another role is that of an "auditor". The purpose of an Auditor is to keep a check on the ledger writer by proving that agreement evolutions are properly executed and authorized and that involved parties were notified and no contradicting agreements were recorded. Similar to the ledger writer, an Auditor will have some visibility into agreements, but in addition it will also have knowledge of shared secrets for many parties. A breach of protocol by the Ledger Writer would be flagged by the Auditor and handled outside of the described shared infrastructure. Since the Auditor's task is the execution of a checking algorithm that needs no human discretion or oversight, the Auditor may be an autonomously executed algorithm running within a secure computing environment. Communication with the secure environment may be encrypted, and it may be configured so no data may leave the secure environment except for raising a flag on any failed rule validation the Auditor observes.

By default, all parties to an agreement need to authorize it. The agreement might supersede a previous one. An agreement is typically "eventful" in that it depends on at least one external input or event, but is not required to be. The syntax and the interpretation of an agreement are left entirely up to the parties to agree "off ledger". An exemplary embodiment ledger records such off-ledger agreements, but does not attempt to interpret them. Under particular circumstances, such an agreement leading to an active agreement may meet the requirements of a legally enforceable contract in a given jurisdiction if that was the intention of the parties and their respective authorizations had legal standing. In general, the ledger does not care whether a given agreement is legally enforceable, and an exemplary embodiment makes no distinction between a general agreement and one meeting the standards of a legally enforceable contract. Where desired, the present inventive concept envisions that a master contract may be used to give DAML agreements legal status as contracts in particular jurisdictions.

All code, data structures and the like discussed above can be stored in non-transient computer readable storage media. Functional steps described herein can be accomplished by computer code executed on a processor. The various data manipulations described above can be accomplished on stored data structures to create transformed data structures that are processed by a computer processor in a different manner. The various functions of the embodiments allow a computing system to operate in a new manner to accomplish transactions and provide new advantages. The various flowchart steps can be accomplished by software modules executed on a computer processor. Blocks illustrated in the figures can represent data structures, such as databases storing records, which are manipulated in the described manner to allow a computing system to operate on the data and transform the data.

While the inventive concept has been described herein by way of example with respect to non-limiting exemplary embodiments; other alternatives, modifications, and variations will be apparent to those of ordinary skill in the pertinent art based on the teachings disclosed herein. Accordingly, the scope of the appended claims is intended to include all such alternatives, modifications and variations on the exemplary embodiments set forth herein, as well as equivalents thereof that fall within the scope and spirit of the present disclosure.

The invention claimed is:

1. A method comprising:

receiving, by one or more processors, an input including a decision of a first party with regard to an agreement among a plurality of parties including the first party;

deriving, by the one or more processors, a portion of the plurality of parties from the received input, where the portion of the plurality of parties is limited to only parties of the agreement affected by the decision of the first party;

for each given party of the portion of the plurality of parties:

generating, by the one or more processors, a token according to a function of both a cryptographic key of the given party and a cryptographic key of a second party; and transmitting, by the one or more processors, the decision of the first party, the generated token, and an identity of the second party to a private data store of the given party, wherein the decision of the first party and the generated tokens are transmitted to the private data stores of only the portion of the plurality of parties.

2. The method of claim 1, wherein transmitting the decision of the first party and the generated tokens comprises:

converting the decision of the first party to an abstract syntax tree (AST); and transmitting the AST.

3. The method of claim 1, wherein transmitting the decision of the first party and the generated tokens comprises:

converting the decision of the first party to an abstract syntax tree (AST);

partially blinding portions of the AST using one or more Merkle Hashes to form a Merklized AST (MAST); and transmitting the MAST.

4. The method of claim 1, wherein the token is generated according to either one of (i) a function of an identity of the given party and a private key of the second party or (ii) a function of the identity of the second party and a private key of the given party.

5. The method of claim 1, wherein the second party is a ledger writer node.

6. A system comprising:

one or more processors; and memory comprising instructions that, when executed, cause the one or more processors to:

in response to receiving an input including a decision of a first party with regard to an agreement among a plurality of parties including the first party, derive a portion of the plurality of parties from the received input, where the portion of the plurality of parties is limited to only parties of the agreement affected by the decision of the first party;

for only each given party of the portion of the plurality of parties, generate a token according to a function of both a cryptographic key of the given party and a cryptographic key of a second party and transmit the decision of the first party, the generated token, and an identity of the second party to a private data store of the given party.

7. The system of claim 6, wherein the instructions, when executed, cause the one or more processors to:

convert the decision of the first party to an abstract syntax tree (AST); and transmit the AST.

8. The system of claim 6, wherein the instructions, when executed, cause the one or more processors to:

convert the decision of the first party to an abstract syntax tree (AST);

partially blind portions of the AST using one or more Merkle Hashes to form a Merklized AST (MAST); and transmit the MAST.

* * * * *